(12) United States Patent
Ichikawa et al.

(10) Patent No.: US 6,271,897 B1
(45) Date of Patent: *Aug. 7, 2001

(54) PROCESS OF PRODUCING A SEMICONDUCTOR DEVICE

(75) Inventors: Takeshi Ichikawa, Hachiohji; Akira Okita, Yamato, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,978

(22) Filed: May 30, 1997

(30) Foreign Application Priority Data

Jun. 4, 1996 (JP) .................................... 8-141568

(51) Int. Cl.⁷ .................................................... G02F 1/136
(52) U.S. Cl. ................................ 349/43; 349/41; 257/59
(58) Field of Search ................................. 257/57, 59, 51; 438/23, 30; 349/41, 43

(56) References Cited

U.S. PATENT DOCUMENTS 5,434,433 * 7/1995 Takasu et al. ........................... 257/59
5,633,176 * 5/1997 Takasu et al. ........................... 438/23

FOREIGN PATENT DOCUMENTS 0586147 3/1994 (EP) .
0604231 6/1994 (EP) .
0689085 12/1995 (EP) .

* cited by examiner

Primary Examiner—James A. Dudek
(74) Attorney, Agent, or Firm—Fitzpatrick, Cella, Harper & Scinto

(57) ABSTRACT

A process of producing a semiconductor substrate for a liquid crystal display device which comprises:

a display portion having a plurality of pixels and a thin film transistor comprising respective non-monocrystalline semiconductor active region connected to each said pixel;

a peripheral circuit driving portion comprising a monocrystalline semiconductor region for receiving image input signals and driving said display portion, wherein said display portion and said peripheral circuit driving portion are monolithically formed;

a first oxide film under said non-monocrystalline semiconductor region;

and a second oxide film which is formed in said peripheral circuit driving portion and isolates an element constituting said peripheral circuit driving portion:

which process is characterized in that first and second oxide film are formed in separate steps, and in that the second oxide film is formed thinner than the first oxide film.

9 Claims, 14 Drawing Sheets

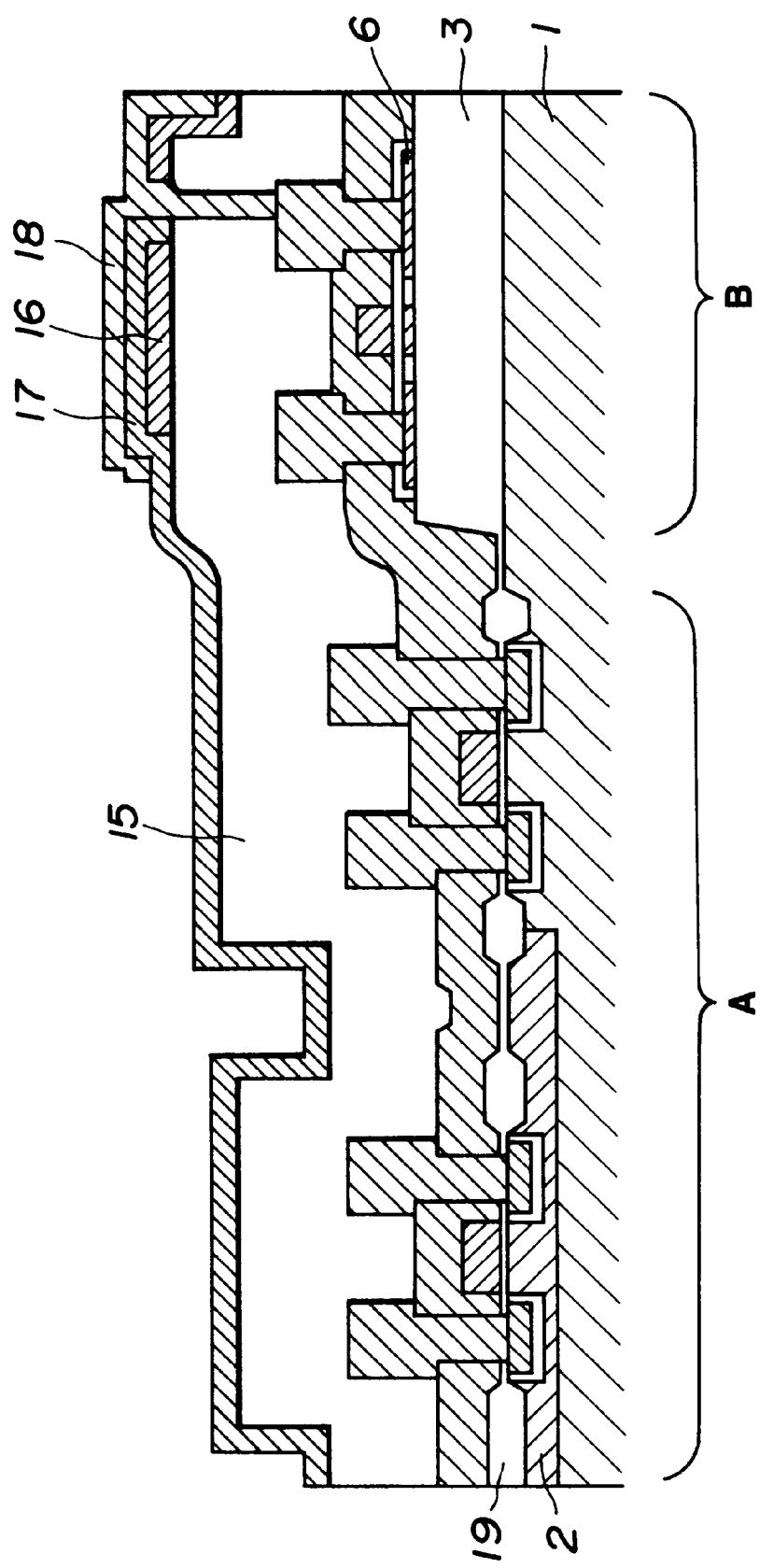

PROCESS OF PRODUCING A SEMICONDUCTOR DEVICE

BACKGROUND OF THE INVENTION

1. Field of the Invention

The present invention relates to a liquid crystal display device, especially to an active matrix type liquid crystal display device, a substrate therefor and processes for production of such devices and substrate.

2. Related Background Art

Recently, display images which have higher resolution have been needed in liquid crystal display devices.

Especially, the active matrix type display panel, which uses thin film switching elements to drive pixels has been rapidly developed because it has been easier to make progress in the development of higher pixel density and higher gradation expansion for the active matrix type liquid display compared to other types of liquid crystal display.

As to the thin film switching elements used for active matrix type liquid crystal display panels, in general, in large panels, which are 12.5 cm (5 inches) or larger (across each diagonal), mainly thin film transistors which use amorphous silicon (a-Si) have been applied, whereas in small panels, which are less than 12.5 cm (5 inches), mainly thin film transistors which use poly-crystalline silicon (p-Si) have been applied.

A schematic view of a liquid crystal display panel using p-Si TFT, is shown in FIG. 12. In FIG. 12, a vertical shift register 303 and a horizontal shift register 304 are connected to a panel display circuit 305 which has p-Si TFT, as the switching elements arranged in a matrix. TV signals transmitted from a video signal circuit 301 pass through the vertical shift register 303 and the horizontal shift register 304 and are applied to pixels in the display circuit 305. 302 is a synchronizing circuit to synchronize the two shift registers 303 and 304. Recently, shift registers 303 and 304 have been made using p-Si and these shift registers have been integrated in the display panel. A cross sectional view of a p-Si TFT is shown in FIG. 13. In FIG. 13, a source region and a drain region, comprised of for example n$^+$ diffused layer 1403 and n$^-$ diffused layer 1407, are formed in a thin film of poly-silicon on a quartz or glass substrate 1401. Applying voltage to a gate electrode 1406 isolated by a gate insulator film 1405 controls On/Off operation. The n$^-$ diffused layer 1407 is provided especially to reduce electric field under the gate electrode 1406 in the vicinity of the drain, is effective to reduce leakage current between the drain and the source and to increase withstand voltage. 1408 are source and drain electrodes, comprised for example of aluminium. 1410 is an interlayer insulating film comprised of, for example, silicon oxide. 1409 is a surface protective layer comprised for example of silicon nitride film. An equivalent circuit of the liquid crystal panel is shown in FIG. 14. In FIG. 16 pixel electrodes 406 are provided corresponding to points of intersection between a plurality of signal lines 401a–401d and a plurality of scanning lines 402a–402d. The drain of a TFT 403 is connected to each respective pixel electrode. The signal lines 401a–401d are connected to sources of the TFT 403 and the scanning lines 402a–402d are connected respectively to drains of the TFT 403. Video signals from the signal lines 401a–401d are applied to the pixel electrodes 406. Drains of the TFT 403 are connected to storage capacitor 404 in order to store applied electron charge for a long time and another terminal 405 of the capacitor electrode is connected to the same voltage as all pixels or some pixels in the same row.

On the other hand, as to efficiency which is needed for each circuit, in consideration of high definition television, if the frame frequency is 60 Hz, the number of scanning lines is approximately 1000, the horizontal scanning period is approximately 30 μsec (effective scanning period is 27 μsec), and the number of pixels in the horizontal direction is approximately 1500. Television signals are transferred to a buffer at a frequency of approximately 45 MHz. Therefore as to efficiency which is needed for each circuit, especially driving efficiency of the horizontal shift register, an operation frequency of 45 MHz or more is needed.

As will be realized easily from the above explanation, pixel switching elements which have a relatively low driving efficiency are acceptable, but horizontal shift registers having high driving efficiency are needed. Therefore nowadays in liquid crystal display panels, the pixel switching elements or the vertical shift register or both are formed monolithically using TFTs formed in poly-crystalline silicon or amorphous silicon deposited on glass substrates. Other peripheral circuits are formed by attaching IC chips. It has been known to form the peripheral circuit monolithically using poly-crystalline silicon TFTs, but in this case in the circuit the size of transistors is larger because the driving efficiency of each transistor is low.

On the other hand in the case of view-finders used for VTR cameras and reflective type liquid crystal displays, it is important that the substrate is transparent in the visible light region.

To solve these problems, a new proposal has been disclosed in Japanese patent application JP-A-08-069015. The new proposal is as follows. A peripheral circuit portion which constitutes a horizontal shift register is comprised of single crystalline elements and a thin film transistor portion is formed with non-single crystalline semiconductor elements. A portion of the monocrystalline semiconductor region is removed from backside to leave a transparent film under the non-single crystalline semiconductor region.

However in the above mentioned prior art there is the following problem to solve. In JP-A-08-069015 an example that a field oxidation film as an isolation region in a peripheral circuit and an oxide film under thin film transistors are formed in the same thickness by the same process has been disclosed. If the isolation region of the peripheral region in the example is to be smaller, the oxide film under the thin film transistors is to be thinner and the reliability of removing the monocrystalline semiconductor region from the backside is reduced. If the oxide film under the thin film transistors is to be thicker there is a trade-off that the isolation region of the peripheral circuit is to be larger. Therefore it is difficult to satisfy both requirements of reducing cost and upgrading reliability. If the oxide film under the thin film transistors is not used as a stopper in the case of removing the monocrystalline semiconductor region from the backside and another film is used as a stopper, on the contrary to the aforementioned example it is unnecessary that the oxide film under the thin film transistors is as thick as the field oxide film of the isolation region of the peripheral circuit. If the oxide film under the thin film transistors is formed at the same time as forming the field oxide film, an oxide film which is formed after patterning is used as the oxide film under the thin film transistors. Therefore the oxide film which is formed after the patterning is inferior to an oxide film which is oxidized before patterning due to defects such as pinholes and the like. It becomes a factor of not doing well as to the process of the removing the monocrystalline semiconductor region from backside and gives rise to deterioration of picture quality based on point defect or line defect etc. and yield ratio.

SUMMARY OF THE INVENTION

A purpose of this invention is to solve the aforementioned problems and to reduce deterioration of picture quality due to defects in the oxide film and to provide a superior liquid crystal display device and a process for production thereof. Another purpose of the invention is to provide a superior liquid crystal display which has a strong membrane structure and that is capable of displaying a high quality, high resolution, picture and a process for production thereof.

The inventors of this invention have endeavoured to solve the aforementioned problems and have devised the following invention.

A process of producing a semiconductor substrate for a liquid crystal display device which comprises: a display portion having a plurality of pixels and a thin film transistor comprising respective non-monocrystalline semiconductor active region connected to each said pixel; a peripheral circuit driving portion comprising a monocrystalline semiconductor region for receiving image input signals and driving said display portion, wherein said display portion and said peripheral circuit driving portion are monolithically formed; a first oxide film under said non-monocrystalline semiconductor region; and a second oxide film which is formed in said peripheral circuit driving portion and isolates an element constituting said peripheral circuit driving portion; which process is characterised in that first and second oxide film are formed in separate steps, and in that the second oxide film is formed thinner than the first oxide film. In this case it is preferable that said semiconductor region of said thin film transistor is composed of poly-crystalline Si. It is also preferable that said peripheral driving portion comprises monocrystalline Si. Besides, it is preferable that said first oxide film under said non-monocrystalline semiconductor region is formed by thermal oxidation.

The present invention includes a semiconductor substrate for liquid crystal display device. The semiconductor substrate for a liquid crystal display device is as follows. A semiconductor substrate for a liquid crystal display device which comprises: a display portion having a plurality of pixels and a thin film transistor comprising non-monocrystalline semiconductor region connected to each said pixel; a peripheral circuit driving portion comprising a monocrystalline semiconductor region to receive image signals and to drive display portion, wherein said display portion and said peripheral circuit driving portion are monolithic; a first oxide film under said non-monocrystalline semiconductor region; and a second oxide film in said peripheral circuit driving portion to isolate an element constituting said peripheral circuit driving portion: characterised in that: said first oxide film is thicker than said second oxide film. In this case it is preferable that said semiconductor region of said thin film transistor is composed of poly-crystalline Si. It is also preferable that said peripheral driving portion comprises monocrystalline Si.

In this invention it is possible to adjust the thickness of the second oxide film (field oxide film) and the first oxide film under the non-crystalline semiconductor region (thin film transistor) to obtain desirable thicknesses and to form a high reliability, high yield ratio, compact, low cost liquid crystal display device. It is possible that the oxide film under the thin film transistor, which is comprised of poly-crystalline silicon, can be formed as a high quality oxide film. Therefore the reliability of the liquid crystal display device is greatly improved.

The present invention includes a step of producing a liquid crystal display device and a liquid crystal display device. These are as follows. A step of producing a liquid crystal display device comprising the steps of: producing a semiconductor substrate by a process according to this invention; arranging a common electrode substrate opposite said semiconductor substrate; filling the open between said substrates with liquid crystal material, then sealing.

A liquid crystal display device comprises: a semiconductor substrate according to this invention; a common electrode substrate opposite said semiconductor substrate; and a liquid crystal material provided between said semiconductor substrate and said common electrode substrate.

Embodiments of this invention can include forming a film having tensile stress, relative to silicon, between the thin film transistor which is composed of poly-crystalline silicon and the oxide film under the thin film transistor. Therefore, for example, in the case of a transmission type liquid crystal display panel having a membrane structure, it is possible to prevent warping of the membrane by using a silicon nitride film formed by Low Pressure (LP) CVD, or the like, in order to offset compression stress caused from a nitride film formed by plasma CVD or compressive stress caused from other film (for example silicon oxide film). And also it is possible to form a high reliability, high yield ratio, compact, low cost liquid crystal display device. The above mentioned film, having tensile stress relative to silicon, includes silicon nitride. Therefore using known semiconductor material, great effect can be obtained. The thickness of the film which has tensile stress is preferably 20 nm–500 nm. The thickness of the silicon oxide film is preferably thicker than $\frac{1}{10000}$ of the thickness of said semiconductor substrate. In this structure, when a part of the semiconductor substrate is removed to form a transmission type liquid crystal display said silicon oxide acts as a stopper. Therefore it is possible to form a reliable, high yield ratio, compact low cost liquid crystal display device.

Embodiments of this invention can include that said first oxide film (the oxide film under the thin film transistors) and said second oxide film (the field oxide film) are formed to be continuous over at least part of the boundary between said display portion and said peripheral circuit portion with a difference in level between upper surface of said first and second oxide film, or a difference in level between lower surface of said first and second oxide film, or a difference in level between lower surface of said first and second oxide film, or both. The difference in level is preferably 10 nm–1 $\mu$m. In this structure it is possible to eliminate a crack which is peculiar to strong stress materials such as silicon nitride etc. from the thin film transistor region composed of poly-crystalline silicon. Besides, it is possible to form a reliable, high yield ratio, compact, low cost liquid crystal display device.

Also it is preferable that the thickness of the first oxide film under the non-monocrystalline semiconductor region (the thin film transistor) formed with poly-silicon is thicker than the thickness of the second oxide film (the field oxide film) as the isolator of said mono-crystalline element. The difference of the thickness is preferably 10 nm–1 $\mu$m.

In this structure it is possible to design thin field oxide film so as to form a small isolation region of the peripheral circuit portion and also possible to form thick oxide film under the thin film transistor independently from the field oxide film as the isolation region of the peripheral circuit portion.

Therefore it is possible to form a reliable, high yield ratio, compact, low cost liquid crystal display device.

In this invention it is possible to adjust the thickness of the field oxide film and the oxide film under the thin film transistor to obtain desirable thicknesses and to form a high reliability, high yield ratio, compact, low cost liquid crystal display device. Also it is possible that the oxide film under the thin film transistor, which is comprised of poly-crystalline silicon, is formed as a high quality oxide film. Therefore reliability of the liquid crystal display device is greatly improved.

It is possible to form a film having tensile stress, relative to silicon between the thin film transistor which is composed of poly-crystalline silicon and the oxide film under the thin film transistor. Therefore, for example, in the case of a transmission type liquid crystal display panel having a membrane structure, it is possible to prevent warping of the membrane by using silicon nitride film etc. formed by reduced pressure CVD in order to offset against compression stress caused from a nitride film formed by plasma CVD or compressive stress caused from other film (for example silicon oxide film). And also it is possible to form a high reliability, high yield ratio, compact, low cost liquid crystal display device. The above mentioned film having tensile stress relative to silicon includes silicon nitride. Therefore using known semiconductor material, great effect can be obtained.

Besides if the oxide film under the thin film transistor becomes thicker than the field oxide film stress which effects the thin film transistor is reduced. Therefore the characteristics of the thin film transistor are improved and device characteristics based on the silicon surface distribution caused by the stress distribution of a silicon wafer is reduced.

BRIEF DESCRIPTION OF THE DRAWINGS

FIG. 1 is a cross sectional view of the semiconductor substrate for liquid crystal display device in accordance with the first embodiment of the invention.

DETAILED DESCRIPTION OF THE PREFERRED EMBODIMENTS

This invention is going to be explained in detail with reference to embodiments as follows. This invention is not restricted to the scope of these embodiments.

EMBODIMENT 1

Embodiment 1 is explained based on FIG. 1. FIG. 1 is a cross sectional view of a structure capable of being applied to a liquid crystal display of this invention. In FIG. 1, a field oxide film 19 as an isolation region of a peripheral circuit portion A such as a signal line driving circuit and a scanning line driving circuit which comprise shift registers is designed thinner than an oxide film 3 under a thin film transistor region B which is located at a picture display portion and composed of poly-crystalline silicon 6. Besides the peripheral circuit portion, the thickness of the oxide film 3 under the thin film transistor composed of poly-crystalline silicon to act as a stopper during the removal of a part of the silicon substrate from the backside, is thick. Therefore reliability of the liquid crystal display is high.

Figure 2A:
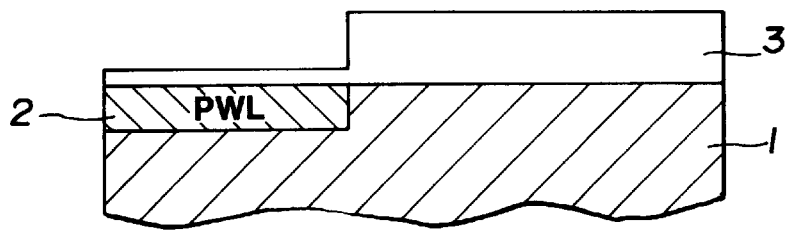
FIG. 2 is a cross sectional view which shows a production process of the semiconductor substrate for liquid crystal display device in accordance with the first embodiment of the invention.
Figure 2B:
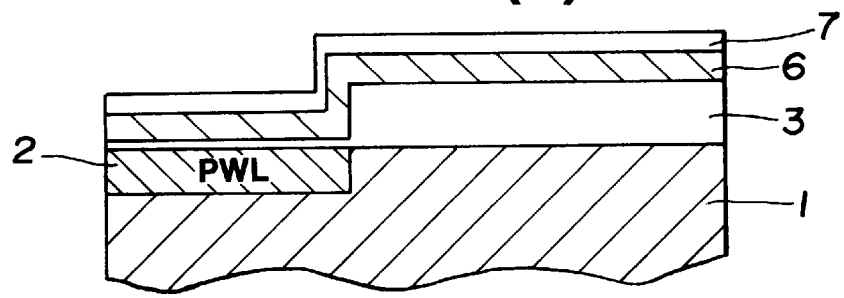
Figure 2C:
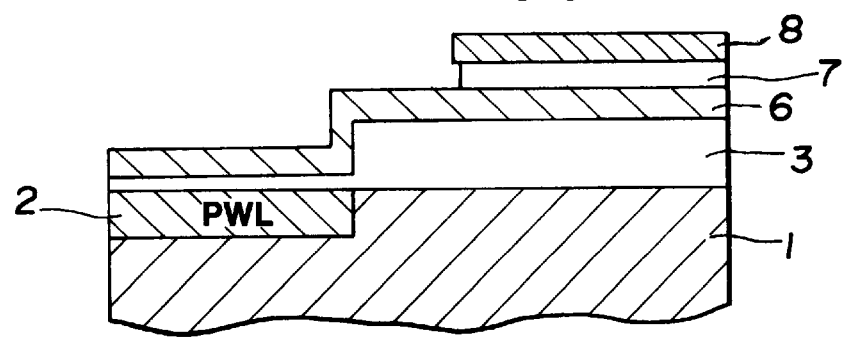
Figure 2D:
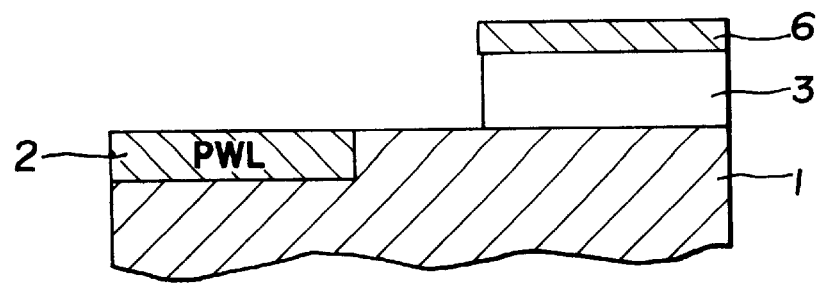
Figure 3A:
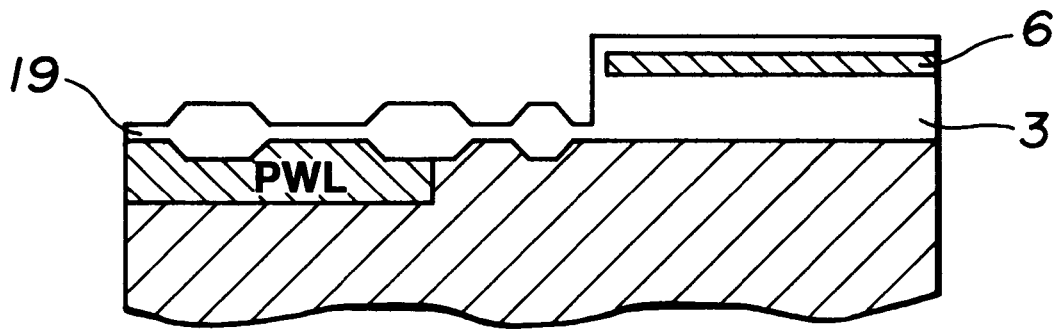
FIG. 3 is a cross sectional view which shows a production process of the semiconductor substrate for liquid crystal display device in accordance with the first embodiment of the invention.
Figure 3B:
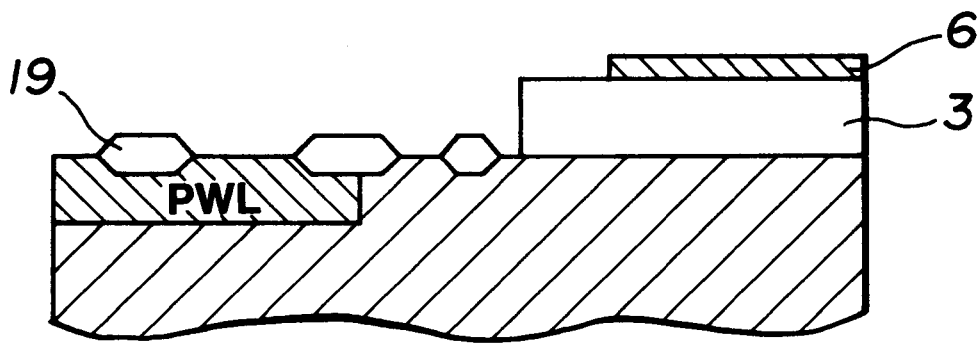
Figure 4A:
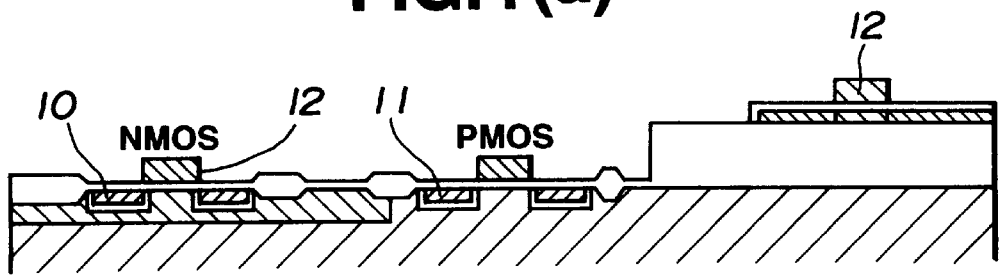
FIG. 4 is a cross sectional view which shows a production process of the semiconductor substrate for liquid crystal display device in accordance with the first embodiment of the invention.
Figure 4B:
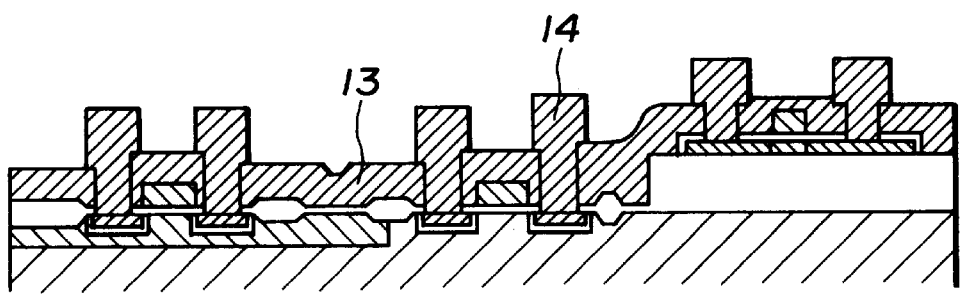
Figure 4C:
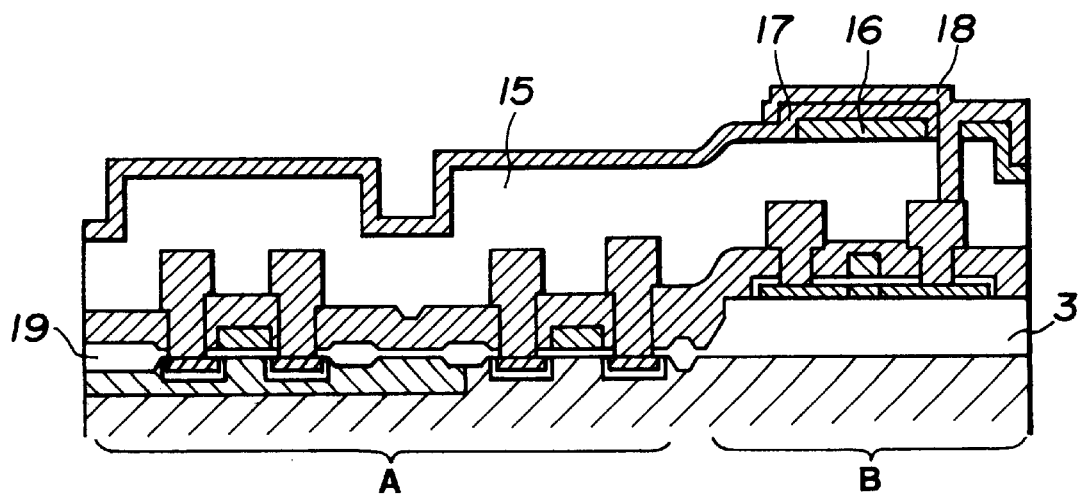

A process to obtain the structure of this invention is explained using FIGS. 2 to 4.

First an n-type silicon substrate is oxidized in the range of approximately 400 nm thickness. Then the oxide film 3 is etched using HF solution or buffered HF solution. Boron under implant conditions of $9 \times 10^{12}/cm^2$, and 60 Kev, is implanted into the substrate to form a p-type well region 2 (FIG. 2(a)). The drive-in is executed for example at 1150° C. for 840 minutes in a nitrogen atmosphere including slight amount of oxygen. The conditions of oxidation need not be restricted. Temperature in the range of 1000° C.–1200° C. is preferable. In this case the thickness of the oxide film 3 becomes approximately 580 nm instead of 400 nm as in the above mentioned example. And then poly-crystalline silicon 6, which is to constitute transistors of the pixel portion, is deposited. Poly-crystalline Si 6 is formed, for example, under the following conditions. Silane diluted by nitrogen is thermally decomposed under a reduced pressure of $10–10^2$ Pa (0.1–1.0 Torr) at temperature of 600 C–700 C. Namely the oxide film 3 is formed using CVD (Chemical Vapour Deposition) apparatus to obtain a thickness of 50–400 nm. After that, for example, oxidation of the poly-crystalline Si 6 or deposition of a film 7 such as NSG (Non doped Silicon Glass) is executed (FIG. 2(b)). After application of a resist 8, patterning is executed and the surface oxide film is removed using HF solution (FIG. 2(c)). Poly-crystalline silicon 6 is removed and the resist 8 is also removed. Then thick oxide film is removed again using the poly-crystalline silicon 6 as a mask using HF solution (FIG. 2(d)). After forming approximately 35 nm thickness oxide film 19, a silicon nitride film whose thickness is 150 nm is formed under a reduced pressure of $10^2$–$10^5$ Pa (1–760 Torr) using a reaction of silane gas and ammonia gas. Then after patterning, a field oxide film is formed up to approximately 450 nm thickness (FIG. 3(a)) and the silicon nitride film is removed. The poly-crystalline silicon film 6 on the pixel portion is removed after patterning (FIG. 3(b)). After removing oxide film, except for the field oxide film 19 a gate oxide film is formed on both TFT (Thin Film Transistor) regions of the pixel portion and the peripheral circuit portion. For example, oxide temperature is preferably 1150 C under an oxygen atmosphere in order to increase the grain size of the poly-silicon which constitutes the TFT portion. But it is not restricted to this. It is also possible to oxidize at 850 C–1200 C under an oxygen or an oxygen and hydrogen mixed gas atmosphere or to form a deposition film such as NSG. After forming poly-silicon 12 as a gate electrode the peripheral circuit portion and source and gate regions 10, 11 are formed by ion implantation. For example nMOS source and drain regions are formed under conditions of $5\times10^{15}/cm^2$, 95 KeV. pMOS source and drain regions are formed by $BF_2$ ion implantation under conditions of $3\times10^{15}/cm^2$, 100 KeV, (FIG. 4(a)). An interlayer insulating film 13 such as BPSG (Boron-Phospho Silicate Glass), NSG (Non-doped Silicate Glass), or PSG (Phosphorus Silicate Glass) is formed to for example 600 nm thickness. Then patterning of contact holes is executed and a wiring layer 14 is formed (FIG. 4(b)).

For example in this embodiment TiN as a barrier metal and Al wiring doped with 0.5–2% of silicon are used. As electrode materials used for conventional semiconductor or TFT processing, such as Al alloy, W, Ta, Ti, Cu, Cr, Mo or silicide of these materials are available. After a patterning of the electrode layer an interlayer insulating film 15 is formed and a patterning of the backside is executed. Then a film 16 such as Ti or TiN as a light shielding film is deposited by sputtering and a patterning of the film is executed. An insulating film to form a capacitor is formed for example as follows. A silicon nitride film 17 is deposited by decomposition of a mixture of silane gas, ammonia gas or a mixture of silane gas and $N_2O$ in a plasma at 200–400 C. Then a poly-silicon layer is thermally annealed, in hydrogen gas or a gas mixture of hydrogen gas and inert gas such as a nitrogen gas for 10–240 minutes until hydrogenated. After forming through holes, an ITO (Indium Tin Oxide) film 18 as a transparent electrode is formed (FIG. 4(c)). Then a liquid crystal is poured between the substrate which has ITO 18 and a substrate which has an opposing electrode. An etching for the backside of the substrate which has ITO 18 is executed up to the oxide film under the pixel portion. If a liquid crystal display device is produced by such a process the oxide film under the pixel portion is formed on the entire surface of the wafer in the initial stage and it does not have a patterning process before the oxidization process. Therefore the oxide film becomes a good film which has few defects and inclusions. Defects such as pin-holes can deteriorate the characteristics of the liquid crystal display markedly as the oxide film under the pixel portion plays a part as a stopper during etching from the backside. In this embodiment, the thickness of the oxide film of the isolation region of the peripheral circuit and the thickness of the oxide film under the pixel potion do not have any relationship therefore these thickness can be designed freely. For example it is possible that the isolation region of the peripheral circuit is small and the oxide film under the pixel portion used as the stopper is designed to be thick. According to this embodiment, it is possible to form a reliable, high yield ratio, compact, low cost liquid crystal display device.

EMBODIMENT 2

Figure 5A:
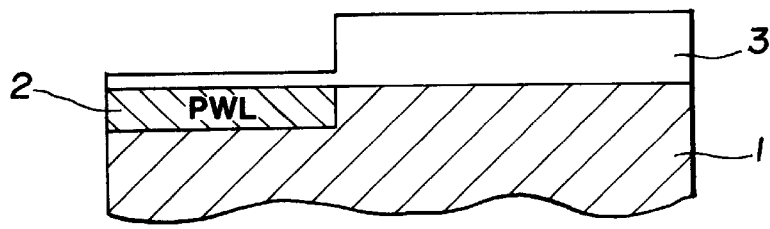
FIG. 5 is a cross sectional view which shows a production process of the semiconductor substrate for liquid crystal display device in accordance with the second embodiment of the invention.
Figure 5:
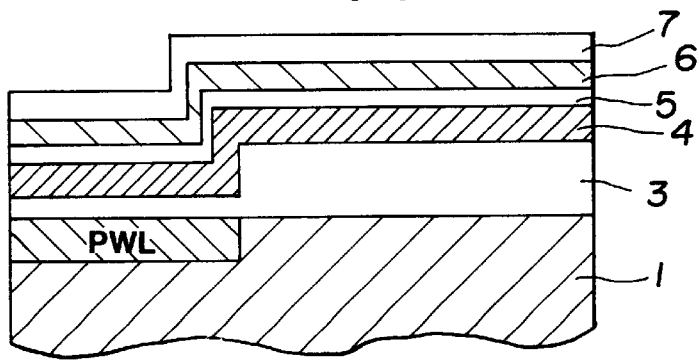
Figure 5:
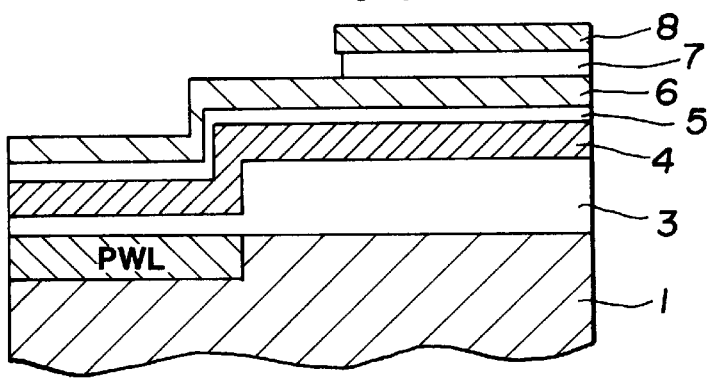
Figure 5:
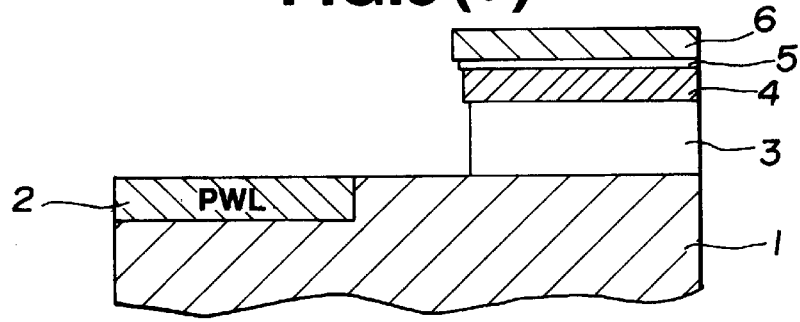
Figure 6A:
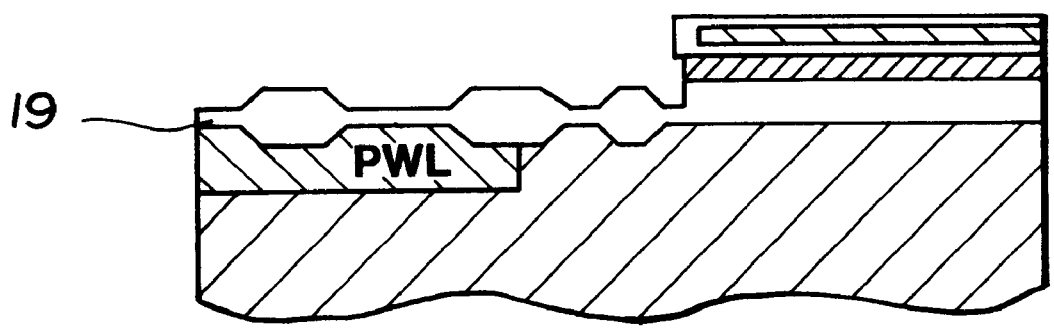
FIG. 6 is a cross sectional view which shows a production process of the semiconductor substrate for liquid crystal display device in accordance with the second embodiment of the invention.
Figure 6B:
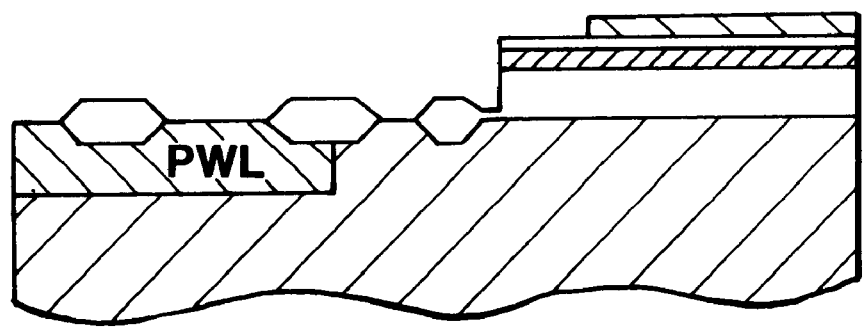
Figure 7A:
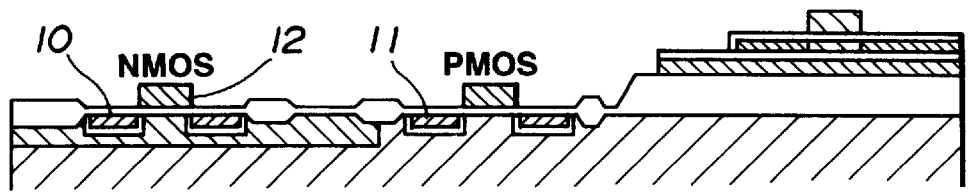
FIG. 7 is a cross sectional view which shows a production process of the semiconductor substrate for liquid crystal display device in accordance with the second embodiment of the invention.
Figure 7B:
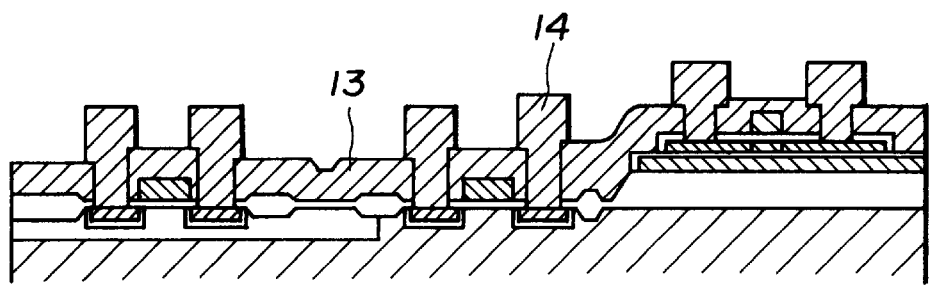
Figure 7C:
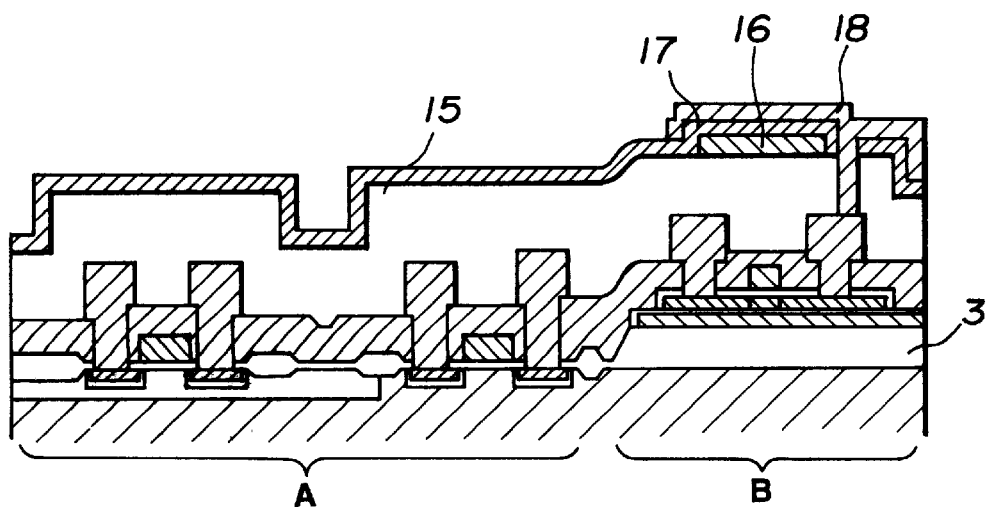

Embodiment 2 is explained using FIGS. 5 to 9. FIGS. 5 to 7 are cross sectional views which show production processes of the structure of the liquid crystal display device embodying the invention. A field oxide film for use as an isolation region of peripheral circuit portion A, such as a signal line driving circuit and a scanning line driving circuit including a shift register is designed thinner than an oxide film under thin film transistors composed of poly-crystalline silicon. The peripheral circuit is small and the oxide film, under the thin film transistors composed of poly-crystalline silicon, to be used as a stopper during removal of a part of the silicon substrate from the backside, is thick, to obtain a liquid crystal display device which has a high reliability. In this embodiment, an oxide film and a nitride film are provided under the thin film transistors composed of poly crystalline silicon. A silicon nitride film, or similar film, having tensile stress relative to silicon, can be formed by reduced pressure CVD using usual semiconductor materials. Therefore, for example, in the case of a transmission type liquid crystal display panel having a membrane structure, it is possible to prevent warping of the membrane by using silicon nitride film or similar, in order to offset compressive stress caused from a nitride film formed by plasma CVD or compressive stress caused from other films (for example silicon oxide film). Also it is possible to form a high reliability, high yield ratio, compact, low cost liquid crystal display device.

A process to obtain the structure of this invention is explained using FIG. 5. First a n-type substrate is oxidized up to approximately 400 nm and a patterning is executed. Then boron ions are implanted under conditions of $9\times10^{12}/cm^2$ dose amount, 60 KeV energy, to form a p-type well region 2 (FIG. 5(a)). The driving is executed at, for example, a temperature of 1150 C, but it is not necessary to restrict it to this. A silicon nitride film #4 whose thickness is 100–400 nm is deposited under a reduced pressure of $10^2$–$10^5$ Pa (1–760 Torr) by reacting silane gas and ammonia gas. An oxide film 5 is deposited. Then poly-crystalline silicon 6, which is to constitute transistors of the pixel portion, is deposited. The poly-crystalline silicon 6 is formed by for example reduced pressure type CVD (Chemical Vapour Deposition). But it is not restricted. For example, poly-crystalline silicon 6 is oxidized or a film such as NSG (Non doped Silicon Glass) or similar is deposited (FIG. 5(b)). After applying a resist a patterning is executed and a surface oxide film 7 is removed (FIG. 5(c)). The poly-crystalline silicon 6 is removed, and after removing the resist 8, a nitride film is removed using phosphoric solution at a temperature of 100–200 C. The thick oxide film is removed using the poly-crystalline film 6 as a mask (FIG. 5(d)). Then after patterning, a field oxide film 19, whose thickness is approximately 450 nm, is formed (FIG. 6(a)). After patterning the poly-crystalline silicon 6 on the pixel portion is removed (FIG. 6(b)). A gate oxide film is formed on both TFT (Thin Film Transistor) regions of the pixel portion and the peripheral circuit portion. For example the oxide temperature is preferably 1150 C. A poly-crystalline silicon film 12, to form a gate electrode, is formed and a peripheral circuit portion and source and drain regions of the pixel portion are formed by ion implantation (FIG. 7(a)). After forming an interlayer insulating film 13 a patterning of contacts is executed and a wiring layer 14 is formed (FIG. 7(b)). An interlayer insulation film 15 is formed and the backside is patterned.

Then a film 16 such as Ti or TiN, to act as a light shielding film, is deposited and a patterning of the film is executed. An insulating film 17 to form a capacitor is formed. After forming through holes, an ITO (Indium Tin Oxide) film 18, to act as a transparent electrode, is formed (FIG. 7(c)). Then a liquid crystal is poured between the substrate which has ITO 18 and a substrate which has an opposing electrode. Etching from the backside of the substrate, which has ITO 18, is executed up to the oxide film under the pixel portion.

$SiO_2$ film 3 plays a role as a stopper in removing the silicon film. The thickness of a $SiO_2$ film 702 which would be explained later is thicker than 1/10000 of the thickness of a silicon substrate 1 such that the $SiO_2$ acts as a stopper adequately if TMAH is used as the etchant. It is based on an experimental result that the selection ratio of the etching rate for Si and $SiO_2$, using tetramethyl ammonium hydroxide (TMAH), is approximately 55:1–10,000:1, and is effected by concentration of the TMAH and temperature.

Figure 8:
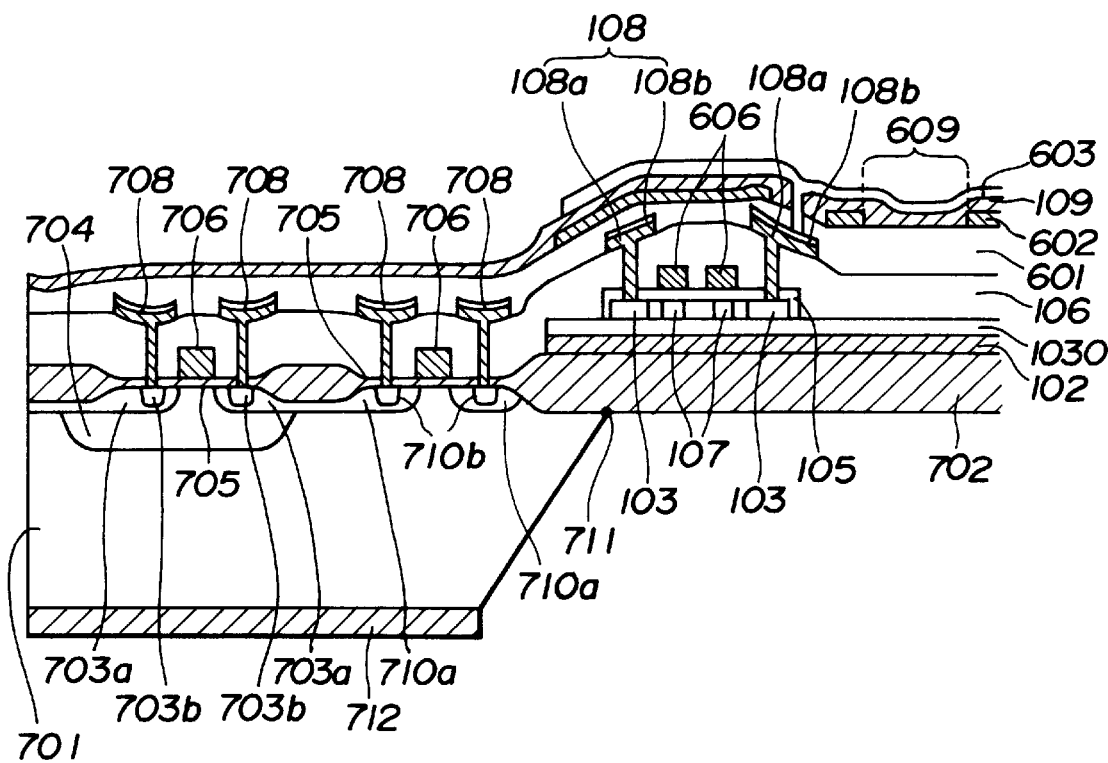
FIG. 8 is a cross sectional view of the liquid crystal display device in accordance with the second embodiment of the invention.

FIG. 8 is a cross sectional view of an active matrix substrate (TFT substrate) composed of bulk silicon in which a signal line driving circuit and a scanning line driving circuit are integrated for a transmission type liquid crystal display. A circuit in the bulk silicon is composed of a CMOS, but it is not restricted. In FIG. 8, 701 is a silicon substrate, 702 is a thick oxide film. 703a are low concentration source and drain of an NMOS transistor and 703b are high concentration source and drain of an NMOS transistor. 704 is a p type well of the NMOS transistor and 705 is a gate oxide film. 706 are poly silicon gates and 708 are source and drain electrodes. 710a are low concentration source and drain of the PMOS transistor and 710b are high concentration source and drain of the PMOS transistor. 712 is a oxide film of backside. The TFT portion has a dual gate structure. But it is not restricted. In this embodiment the silicon substrate of the TFT portion was removed in order to form a transmission type liquid crystal display device. 711 is an etching edge and it determines the size of the display region. 712 is an etching mask for removing a part of the silicon substrate. A part under the thick oxide film is removed by etching.

Figure 9:
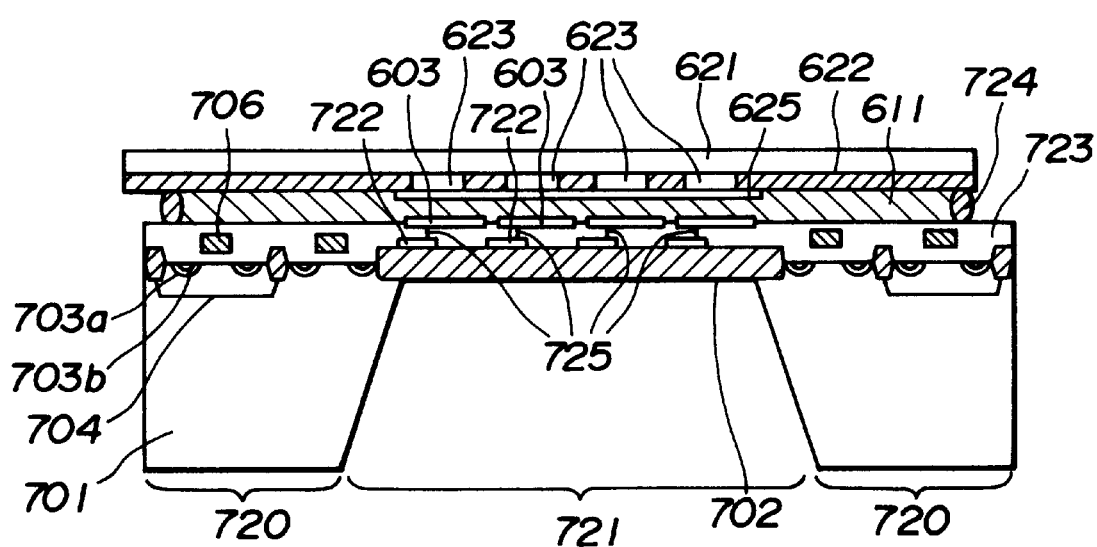
FIG. 9 is a cross sectional view of the liquid crystal display device in accordance with the second embodiment of the invention.

FIG. 9 is a cross sectional view of a liquid crystal display device in which the TFT substrate shown in FIG. 8 is used.

In FIG. 9, 720 is a supporting member and 721 is a hollow portion which is beneath a transparent region that is the display region of the panel. In FIG. 9 as the same portions as in the FIG. 8 are given the same reference numerals as in FIG. 8, a detailed explanation is omitted. The TFT substrate shown in FIG. 8 is provided parallel to the opposed substrate 621 and a liquid crystal 611 was poured therebetween.

Spacers 724 are provided so as to maintain the thickness of the liquid crystal layer 611 which is designed in consideration of optical characteristics of the liquid crystal. A transparent common electrode 625, which is common to all pixels, or most pixels, is provided at a position opposed to the pixel electrodes 603. In this embodiment, a full colour display panel is disclosed. A colour filter 623 composed of dye or pigment is provided on the opposed substrate 621. Areas between pixels and the peripheral driving circuit area are shielded against outer light by a black matrix of Cr or the like. As to liquid crystal material 611, TN (twist-nematic) type liquid crystal is effective, but STN (super-twist-nematic), FLC (ferroelectric liquid crystal), PDCL (polymer-diffused-liquid-crystal) may instead be employed. If TN, STN and FLC are used, polarizers are provided on both sides of the display device. A back-light is provided at the top or the bottom of the figure. This embodiment devises that tension of the membrane becomes the most suitable condition. The tension of the membrane is determined based on a balance of compression stress, of each film which constitutes the membrane the silicon substrate, and tensile stress. In this embodiment what a compression stress effects on the best is thick oxide film 702 under the pixel. If the thickness is 533 nm a wafer of 12.7 cm (5 inches) diameter warps in the range of 30 $\mu$m. On the other hand what a tensile stress effects on the best is a silicon nitride formed by thermal CVD method. If the thickness of the silicon nitride is 300 $\mu$m the wafer warps in the range of 45 $\mu$m. As the sum of other films' warp is compressive and approximately 15 $\mu$m the total of the warp becomes almost 0 $\mu$m. And in consideration of reduction of a LOCOS oxide film in a silicon removing step, slight tensile stress remains finally and it is preferable to stretch the membrane. This embodiment is not restricted to the above mentioned design. It is possible to design based on the thickness of the oxide film and the nitride film.

In this embodiment a liquid crystal display device which has a high resolution, and high contrast is obtained. Especially a high quality mono-crystalline silicon substrate is used as a driving circuit, therefore it is possible to produce a liquid crystal display device in small size and to obtain a high yield ratio. Besides yield ratio and reliability during the membrane process are high. Since the membrane has a low light reflectivity and a high light transmissivity, the display device has good display quality.

EMBODIMENT 3

Figure 10:
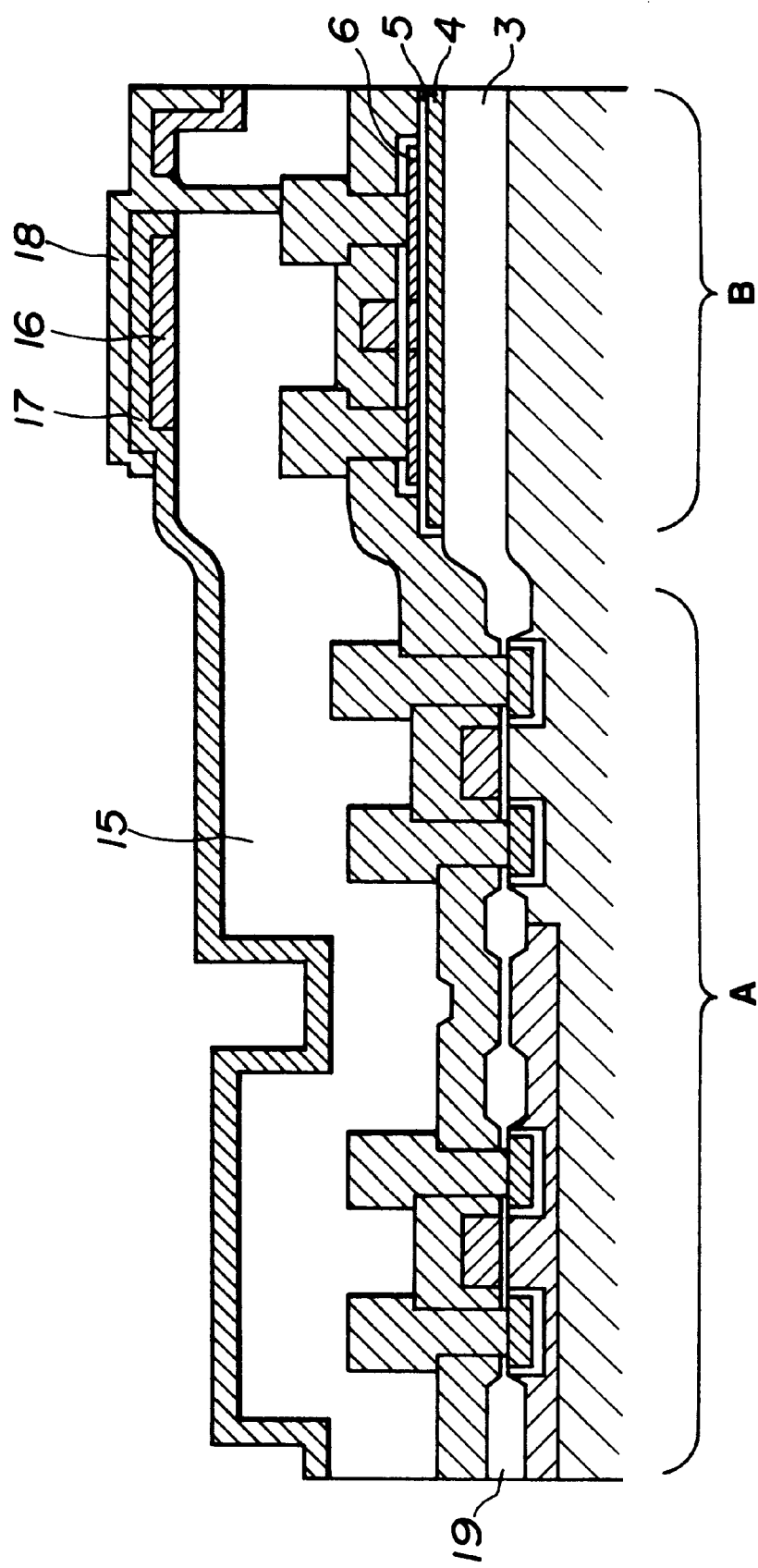
FIG. 10 is a cross sectional view of the liquid crystal display device in accordance with the third embodiment of the invention.
Figure 11A:
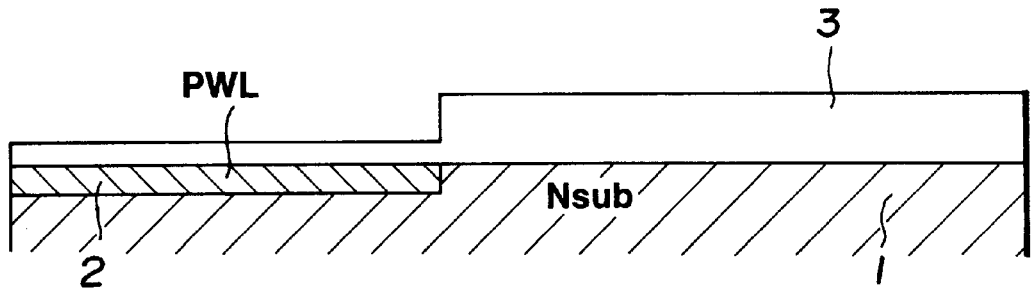
FIG. 11 is a cross sectional view which shows a production process of the semiconductor substrate for liquid crystal display device in accordance with the third embodiment of the invention.
Figure 11B:
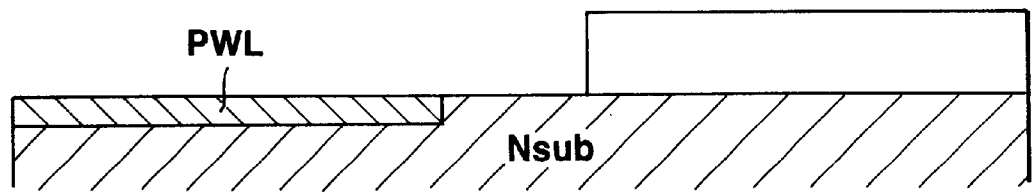
Figure 11C:
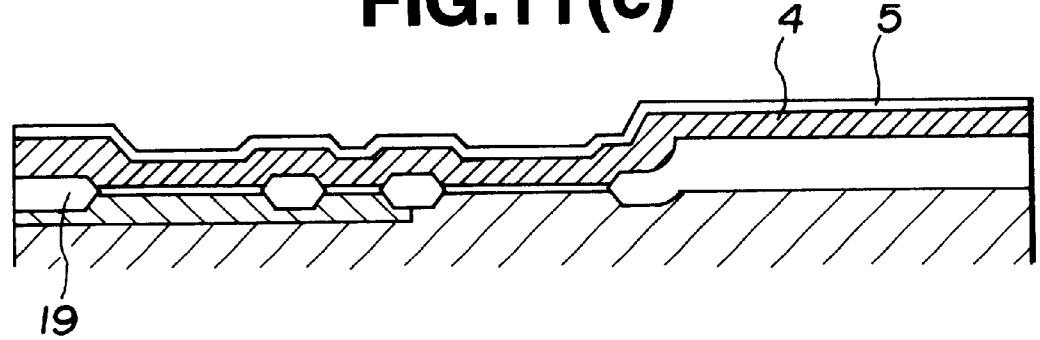
Figure 11D:
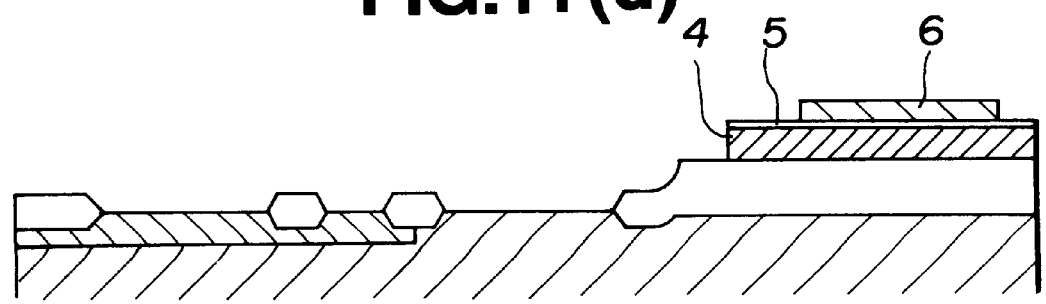
Figure 12:
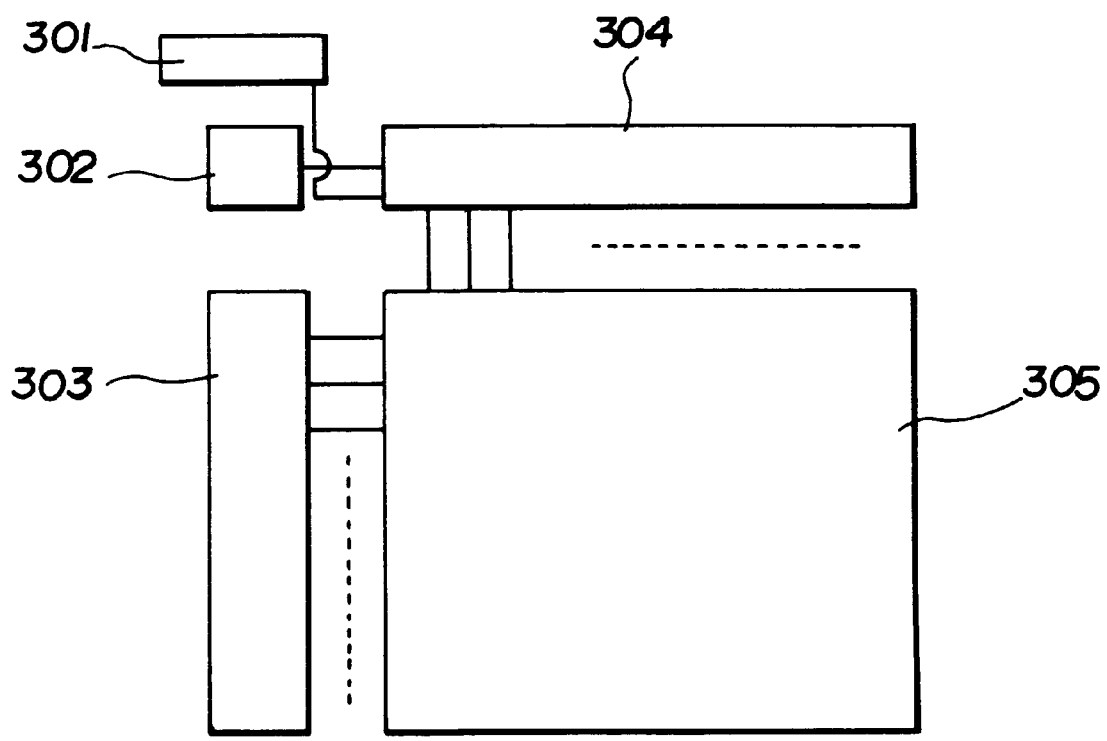
FIG. 12 is a block diagram showing a liquid crystal display device in the prior art.
Figure 13:
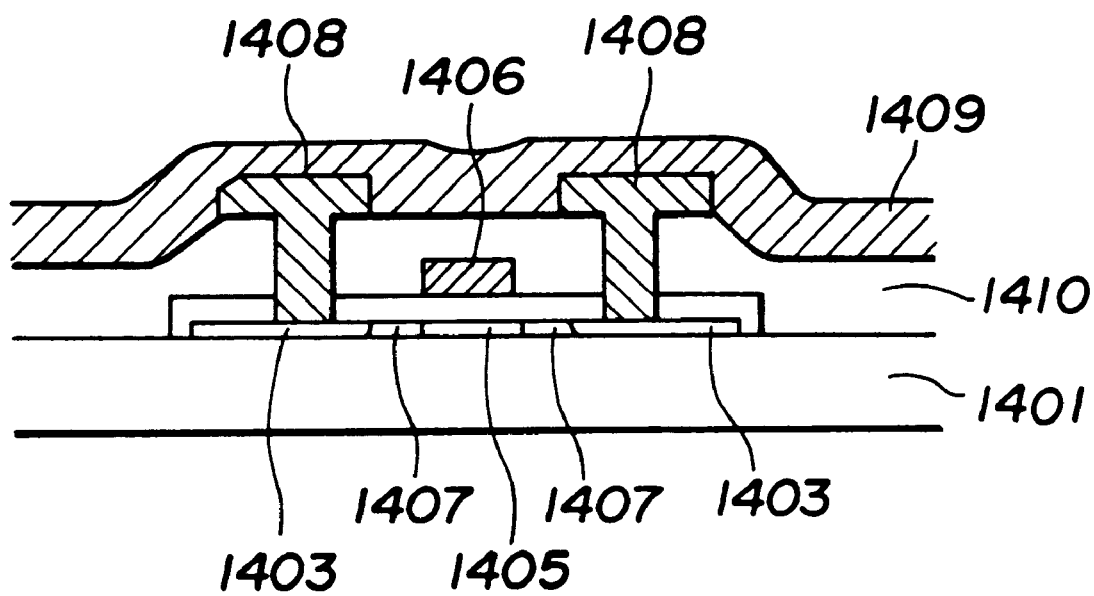
FIG. 13 is a cross sectional view showing poly silicon thin film transistor in the prior art.
Figure 14:
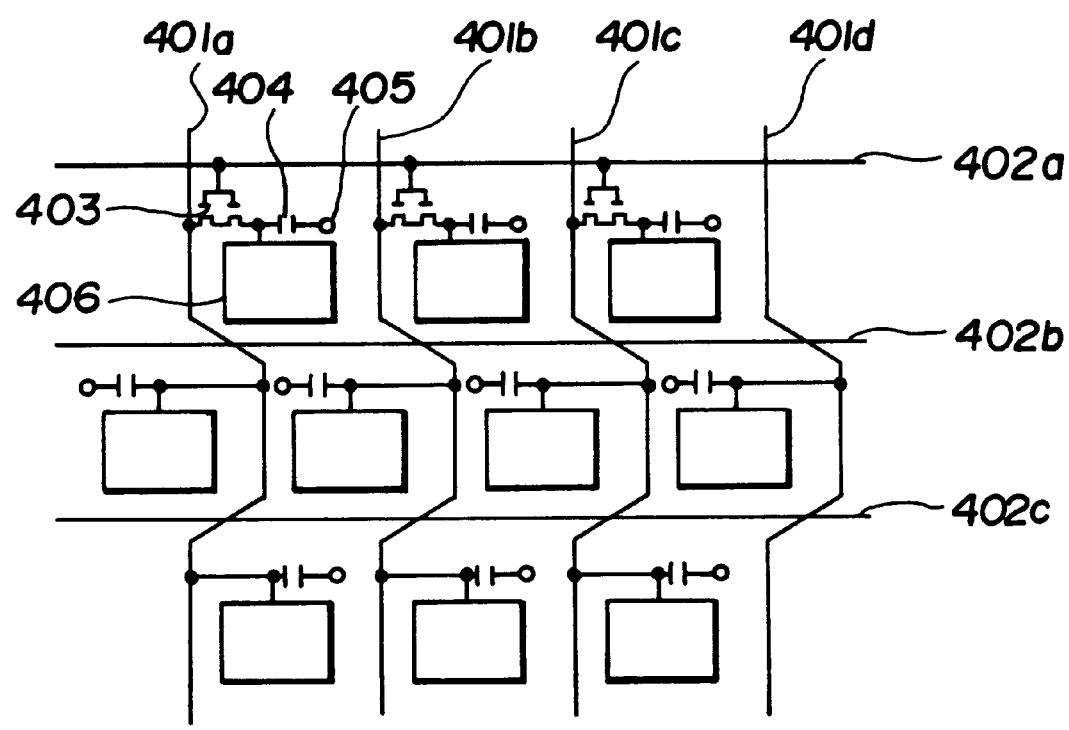
FIG. 14 is a equivalent circuit diagram of a picture display portion of a liquid crystal display in the prior art.

Embodiment 3 is explained based on FIG. 10 and FIG. 11. FIG. 10 is a cross sectional view of structure capable of being applied to a liquid crystal display of this invention. A field oxide film 19 for an isolation region of an peripheral circuit portion A such as a signal line driving circuit and a scanning line driving circuit including shift register is designed thinner than an oxide film 5 under thin film transistors composed of poly-crystalline silicon 6. Each oxide film contacts each other. The peripheral circuit A is small and the oxide film 3 under the thin film transistor composed of poly-crystalline silicon, to act as a stopper on removing the silicon substrate from the backside, is thick. Therefore high reliability is obtained. In this embodiment nitride film 4 is provided between the thin film transistor and the oxide film 3 under the thin film transistors composed of poly-crystalline silicon 6. A silicon nitride film 4, or a similar film, which has tensile stress relative to silicon, is formed by reduced pressure CVD using usual semiconductor materials. Therefore, for example, in the case of a transmission type liquid crystal display panel having membrane structure, it is possible to prevent warping of the membrane by using silicon nitride film etc. in order to offset compression stress caused from a nitride film formed by plasma CVD or compressive stress caused from other film (for example silicon oxide film). Also, it is possible to form a high reliability, high yield ratio, compact, low cost liquid crystal display device.

The upper surface of the field oxide film 19 and the upper surface and the lower surface of the oxide film 3 under the pixel portion are at different levels. In this case it was understood that a big problem was solved. In the above mentioned process in consideration for stress of a film as removing the silicon substrate from the backside it is effective that the nitride film 4 is formed under all pixel portion. However the nitride film tends to be cracked easily. For example if a nitride film whose thickness is 300 nm or more is deposited on the entire surface of 500 $\mu$m thickness oxide film and a high temperature stress, such as 1000 C for, 230 minutes, is applied, cracks over all the surface appear. If there is a crack in the nitride film under the pixel portion, the display device is poor. The crack starts in a peripheral part of the wafer where stress is great and ends at the position of a difference in levels of the oxide film. The nitride film 4 is patterned only on the pixel portion. If a crack appears in the membrane it is preferable that the crack does not appear in the nitride film located on the pixel portion. The crack stops at the difference in rank between the field oxide film and the oxide film under the pixel portion. It was realized that such a structure greatly increases yield ratio.

A process to obtain the structure of this invention is explained. First a n type substrate 1 is oxidized up to approximately 600 nm and a patterning is executed. Then boron ions are implanted under conditions of $9 \times 10^{12}/cm^2$ dose amount, 60 KeV energy to form a p type well region 2 (FIG. 11(a)). The driving is executed at for example 1150 C but it is not restricted. After a patterning of the active region a field oxide film of approximately 450 nm thickness is formed. Then a nitride film 4, whose thickness is approximately 300 nm, is deposited by the reduced pressure CVD (Chemical Vapour Deposition) and the surface of the nitride film 4 is oxidized to form an oxide film 5. For example the oxide film 5 whose thickness is approximately 30 nm is formed under conditions of 1000 C, 230 minutes. A poly-crystalline silicon film 16 which is to constitute the transistors of the pixel portion is deposited and a patterning is executed. The poly-crystalline silicon 16 is formed for example, by reduced pressure CVD. The nitride film 4 is patterned in order to remain just on the pixel portion (FIG. 11(c)). A gate oxide film is formed on both TFT (Thin Film Transistor) regions of the pixel portion and the peripheral circuit portion. For example the oxidation temperature is preferably 1150 C. The following process is the same as in the first embodiment. After forming poly-silicon as a gate electrode the peripheral circuit portion and source and gate regions are formed by ion implantation. For example nMOS source and drain regions are formed by phosphorus ion implantation under conditions of $5 \times 10^{15}/cm^2$, 95 KeV. pMOS source and drain regions are formed by $BF_2$ ion implantation under conditions of $3 \times 10^{15}/cm^2$, 100 KeV. After formation of an interlayer insulating film a patterning of contact holes is executed and a wiring layer is formed. In this embodiment TiN film was used as a barrier metal and Al wiring was used. Then after forming an interlayer insulating layer a patterning of the side is executed. TiN film as a light shielding layer is deposited by sputtering. After patterning an insulating film to form capacity is formed. Then, after forming of through holes, an ITO film is formed as a transparent electrode. Then a liquid crystal is poured between the substrate which has ITO and a substrate which has an opposing electrode. Etching from the backside of the substrate which has ITO is executed up to the oxide film under the pixel portion.

What is claimed is:

1. A process of producing a semiconductor device for a liquid crystal display device which comprises:

a display portion having a plurality of pixels and a thin film transistor comprising respective non-monocrystalline semiconductor active region connected to each said pixel;

a peripheral circuit driving portion comprising a monocrystalline semiconductor region for receiving image input signals and driving said display portion, wherein said display portion and said peripheral circuit driving portion are monolithically formed;

a first oxide film under said non-monocrystalline semiconductor region; and a second oxide film which is formed in said peripheral circuit driving portion and isolates an element constituting said peripheral circuit driving portion:

wherein said first oxide film and said second oxide film are formed to be continuous over at least part of the boundary between said display portion and said peripheral circuit portion, the height of said first oxide film in an upper surface level being higher than that of said second oxide film or the height of said second oxide film in a low surface level being higher than that of said first oxide film.

2. A process according to claim 1, wherein said second oxide film is formed after forming said first oxide film.

3. A process according to claim 1, wherein said non-monocrystalline semiconductor is poly-crystalline silicon.

4. The process according to claim 1, wherein said non-monocrystalline semiconductor region is formed after forming said first oxide film.

5. The process according to claim 1, wherein said second oxide film is formed after forming said non-monocrystalline semiconductor region.

6. A semiconductor substrate for a liquid crystal display device which comprises:

a display portion having a plurality of pixels and a thin film transistor comprising non-monocrystalline semiconductor region connected to each said pixel, said display portion having a first oxide film under said non-monocrystalline semiconductor region;

a peripheral circuit driving portion comprising a monocrystalline semiconductor region to receive image signals and to drive said display portion, said peripheral circuit having a second oxide film which isolates adjacent transistors in said peripheral driving circuit, wherein said display portion and said peripheral circuit driving portion are monolithic, and said first oxide film is continuous with said second oxide film over at least part of the boundary between said display portion and said peripheral circuit portion while the height of said first oxide film in an upper surface level is lower than that of said second oxide film or the height of said second oxide film in a low surface level is higher than that of said first oxide film.

7. A semiconductor substrate according to claim 6, wherein said first and second oxide films are continuous by at least a part of a boundary of said active matrix region and said driving circuit region.

8. A semiconductor substrate according to claim 6, wherein said non-monocrystalline semiconductor is poly-crystalline silicone.

9. A semiconductor substrate according to claim 6, wherein said peripheral circuit comprises a shift register.

* * * * *

UNITED STATES PATENT AND TRADEMARK OFFICE
CERTIFICATE OF CORRECTION

PATENT NO. : 6,271,897 B1
DATED : August 7, 2001
INVENTOR(S) : Takeshi Ichikawa et al.

It is certified that error appears in the above-identified patent and that said Letters Patent is hereby corrected as shown below:

Title page,
Item [57], ABSTRACT,
Line 16, "portion:" should read -- portion, --.

Column 2,
Line 64, "of the" should read -- of --.

Column 3,
Line 49, "portion:" should read -- portion, --; and
Line 50, "that:" should read -- that, --.

Column 6,
Lne 12, "is a" should read -- is an --.

Column 10,
Line 31, "of an" should read -- of a --; and
Line 65, "for," should read -- for --.

Column 12,
Line 8, "portion:" should read -- portion, --;
Line 41, "wherein" should be deleted; and
Line 42, "said" should read -- ¶wherein said --.

Signed and Sealed this

Twenty-sixth Day of March, 2002

Attest:

*Attesting Officer*

JAMES E. ROGAN
*Director of the United States Patent and Trademark Office*